(12) United States Patent
Ruelland et al.

(10) Patent No.: US 8,894,035 B2
(45) Date of Patent: Nov. 25, 2014

(54) PINCH VALVE HAVING PIVOTABLY MOUNTED UPPER AND LOWER CASINGS

(71) Applicants: Frederic Ruelland, Saguenay (CA); Clement Simard, Saguenay (CA)

(72) Inventors: Frederic Ruelland, Saguenay (CA); Clement Simard, Saguenay (CA)

(73) Assignee: Oxo Fab. Inc., Saguenay (CA)

( * ) Notice: Subject to any disclaimer, the term of this patent is extended or adjusted under 35 U.S.C. 154(b) by 25 days.

(21) Appl. No.: 13/667,099

(22) Filed: Nov. 2, 2012

(65) Prior Publication Data

US 2014/0124687 A1 May 8, 2014

(51) Int. Cl.
*F16K 7/04* (2006.01)
*F16K 7/06* (2006.01)

(52) U.S. Cl.
CPC ..................................... *F16K 7/061* (2013.01)
USPC ........................................ 251/8; 251/9; 251/7

(58) Field of Classification Search
USPC ................................. 251/8, 7, 4, 9
See application file for complete search history.

(56) References Cited

U.S. PATENT DOCUMENTS

| | | | | |
|---|---|---|---|---|
| 43,194 A * | 6/1864 | Glasser | ........................ | 269/129 |
| 582,027 A * | 5/1897 | Smith | ................ | 251/8 |
| 950,111 A * | 2/1910 | Miner | ................ | 251/8 |
| 2,212,733 A * | 8/1940 | Grigsby | ........................ | 251/8 |
| 2,245,030 A * | 6/1941 | Gottesfeld et al. | ................ | 251/7 |
| 2,865,591 A * | 12/1958 | Holinshead | ........................ | 251/8 |
| 2,958,502 A * | 11/1960 | Grigsby | ................ | 251/8 |
| 3,268,201 A * | 8/1966 | Little | ................ | 251/8 |
| 4,467,997 A * | 8/1984 | Ziaylek, Jr. | ........................ | 251/7 |
| 5,720,197 A * | 2/1998 | Grau et al. | ...................... | 72/402 |
| 7,159,838 B2* | 1/2007 | Champagne et al. | ............ | 251/7 |

FOREIGN PATENT DOCUMENTS

| | | |
|---|---|---|
| EP | 0336663 A2 | 10/1989 |
| JP | 2000314479 A | 11/2000 |
| WO | 2013064719 A1 | 5/2013 |

* cited by examiner

*Primary Examiner* — John K Fristoe, Jr.
*Assistant Examiner* — Umashankar Venkatesan
(74) *Attorney, Agent, or Firm* — Price Heneveld LLP (57) ABSTRACT

The present disclosure relates to a pinch valve having upper and lower casings respectively supporting upper and lower pinch elements. The upper and lower casings are adapted for receiving a sleeve. A synchronization mechanism drives movements of the upper and lower pinch elements for pinching the sleeve. The upper and lower casings are connected by a pivot allowing pivoting of one or the other of the upper and lower casings for opening of the pinch valve, and for ease of access to the sleeve for maintenance purposes.

20 Claims, 8 Drawing Sheets

PINCH VALVE HAVING PIVOTABLY MOUNTED UPPER AND LOWER CASINGS

TECHNICAL FIELD

The present disclosure relates to the field of industrial valves. More specifically, the present disclosure relates to a pinch valve having pivotably mounted upper and lower casings.

BACKGROUND

A pinch valve generally differs from conventional valves in that, instead of having closing elements that interfere with a fluid flow, they apply pressure on a sleeve to prevent a flow. When in open position, no closing element is present within the sleeve and the flow is unimpeded by the presence of the valve. Pinch valves are frequently used in applications where solid or semi-solid material, such as powder, granules, pellets, fibers or similar material, flow within the sleeve. They may be used in soft applications, such as for example in waste water plants, or in heavy industrial applications.

Conventional mechanical pinch valves apply pressure using a movable closure bar at one point of a circumference of the sleeve, for example at the top of the circumference, flattening the sleeve towards a fixed bottom, thereby greatly deforming the sleeve. Some pinch valves use air pressure for flattening the sleeve.

In any case, a sleeve on which pressure is repeatedly applied by a pinch valve may lose flexibility and crack or otherwise break, as a result of multiple opening and closing cycles. Use of pinch valves, especially mechanical pinch valves, oftentimes requires maintenance for sleeve replacement. Such maintenance implies downtime as the pinch valve may need to be dismounted from a site, moved to a workshop and opened with tools in order to allow changing of the sleeve. Manpower costs and loss of income due to plant downtime may be important.

Therefore, there is a need for a pinch valve that meets requirements of a broad range of applications while providing ease of maintenance.

SUMMARY

According to the present disclosure, there is provided a pinch valve for receiving a sleeve. The pinch valves comprise an upper casing and lower casings for receiving the sleeve. The upper and lower casings are pivotably connected via a pivot. The pinch valve also comprises a synchronization mechanism, supported by the upper casing, for pinching the sleeve by moving the upper and lower pinch elements.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Like numerals represent like features on the various drawings. Various aspects of the present disclosure generally address one or more of the problems of providing a pinch valve able to meet requirements of heavy industrial applications while providing ease of maintenance.

The following terminology is used throughout the present disclosure:

Pinch valve: a control valve using a pinching effect of an internal sleeve to obstruct a flow.

Sleeve: a tubular element insertable in a pinch valve, capable of being compressed for preventing a flow therethrough.

Casing: a part of a frame.

Pinch element: a movable part of a pinch valve for applying pressure on a sleeve.

Pivot: a shaft around which a component may turn.

Locking element: a device for maintaining in place a movable element.

Actuator: a device for exerting a motion.

Hinge: a jointed device having a pivot, allowing an element to swing in relation to another.

Tab: a short projecting element.

Synchronization mechanism: an assembly for making two or more elements act in coincidence.

Handwheel: a wheel that may be turned by hand.

Shaft: an elongate cylindrical bar.

Pin: a solid element for fastening another element.

Brace: a solid piece for attachment to other elements.

Upper and lower: in the context of the present disclosure, these terms are to be understood as relative terms applicable to a pinch valve actuated from above. The pinch valve may be installed in other configurations in which an "upper" element may be below a "lower" element or in which an "upper" and a "lower" element may be side by side.

Figure 1:
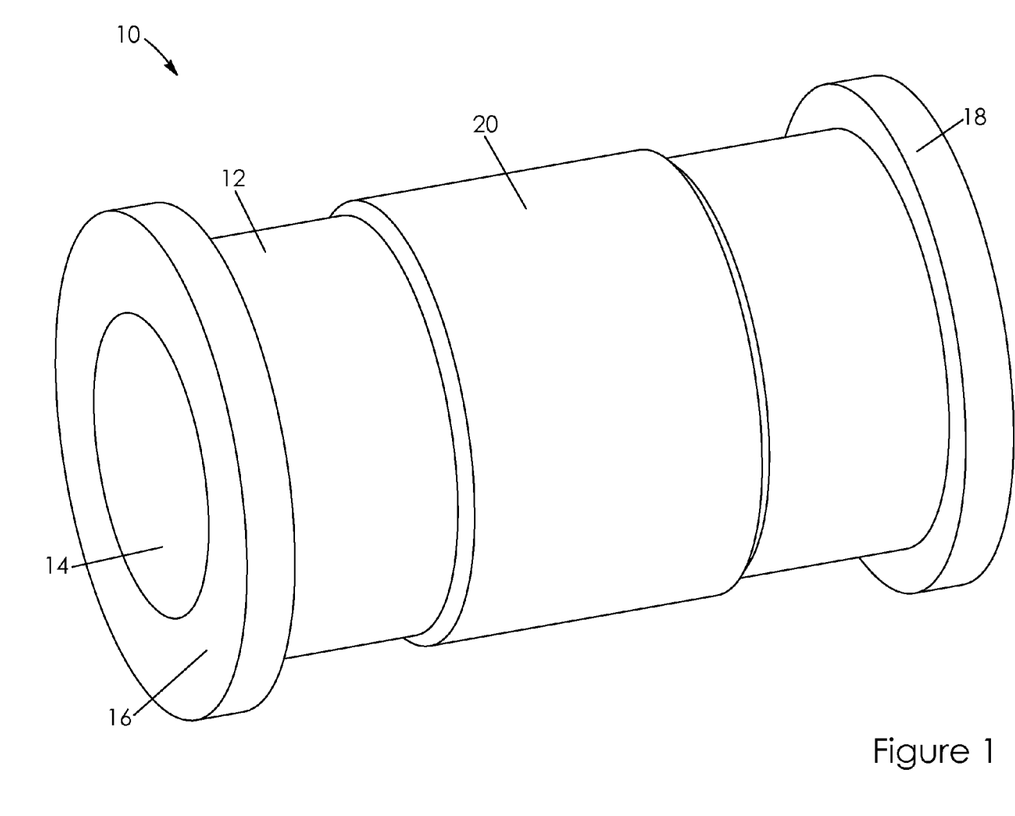
FIG. 1 is a perspective view of a sleeve for use with a pinch valve.

Referring now to the drawings, FIG. 1 is a perspective view of a sleeve for use with a pinch valve. A sleeve 10 has a tubular body 12 and an internal passage 14 throughout its length. The sleeve 10 is terminated at both ends by lips 16 and 18. The tubular body 12 may comprise a reinforced section 20. The sleeve 10 is a replaceable component of a pinch valve that will be described below. Various fluids may circulate through the sleeve 10, under pressurized or vacuum conditions, until pinch elements (shown in later Figures) compress the tubular body 12, usually on the reinforced section 20. The tubular body 12 may be compressed until the internal passage 14 is closed. Closing of the internal passage 14 may be complete, substantially complete or partially complete, depending on the needs of a particular application.

Figure 2:
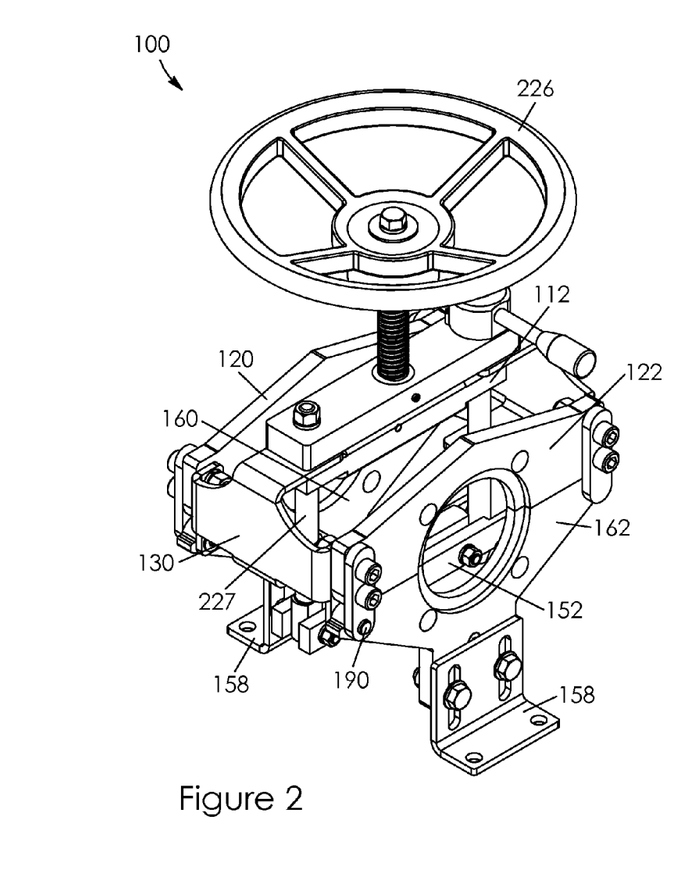
FIG. 2 is a first perspective view of a pinch valve according to an embodiment.
Figure 3:
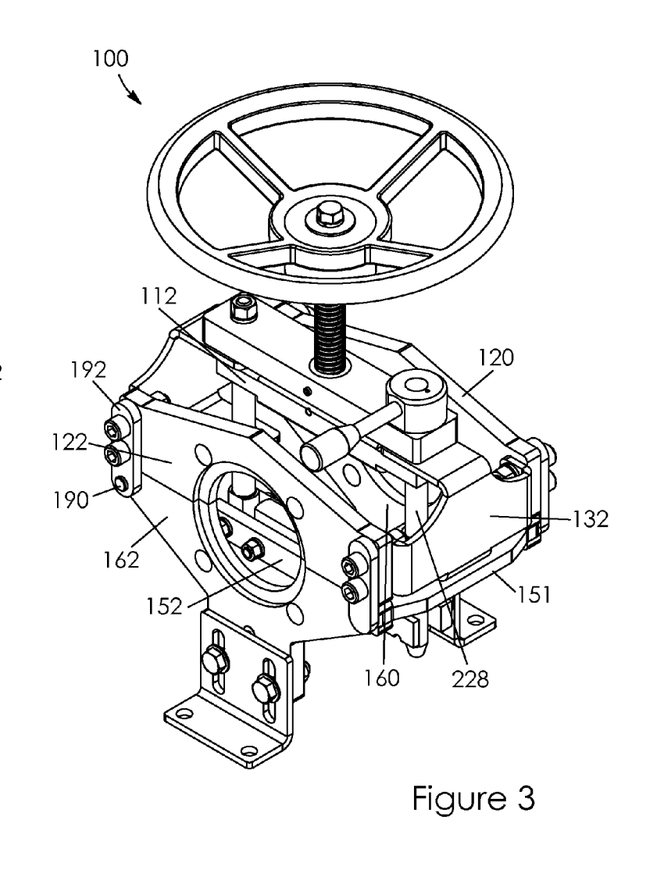
FIG. 3 is a second perspective view of the pinch valve of FIG. 2.
Figure 4:
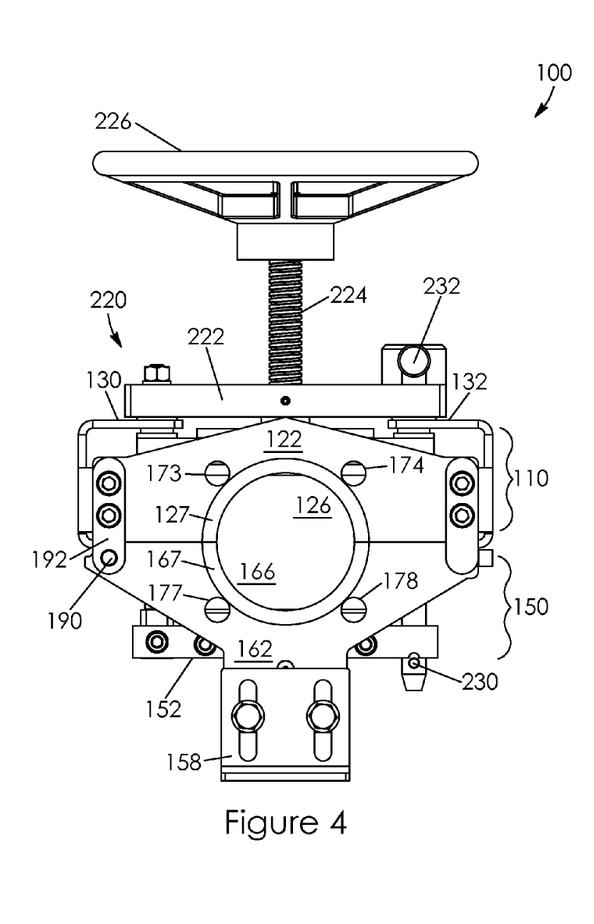
FIG. 4 is a first front elevation view of the pinch valve of FIG. 2.
Figure 5:
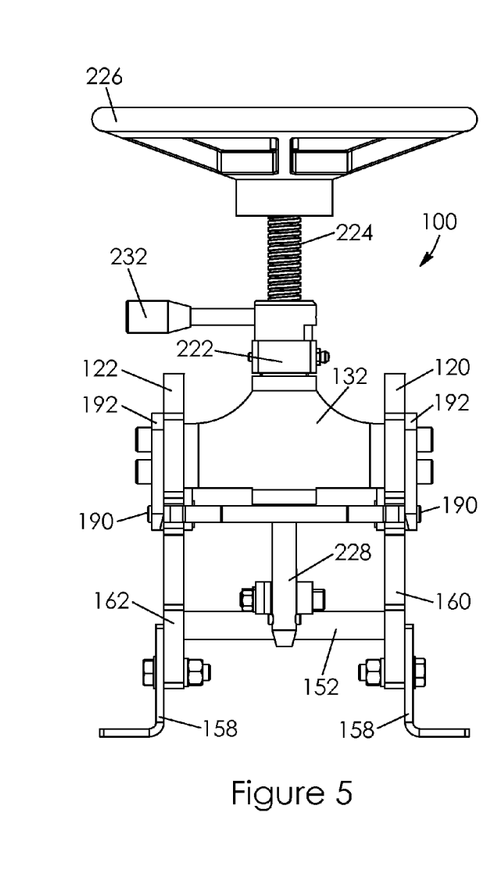
FIG. 5 is a first side elevation view of the pinch valve of FIG. 2.
Figure 6:
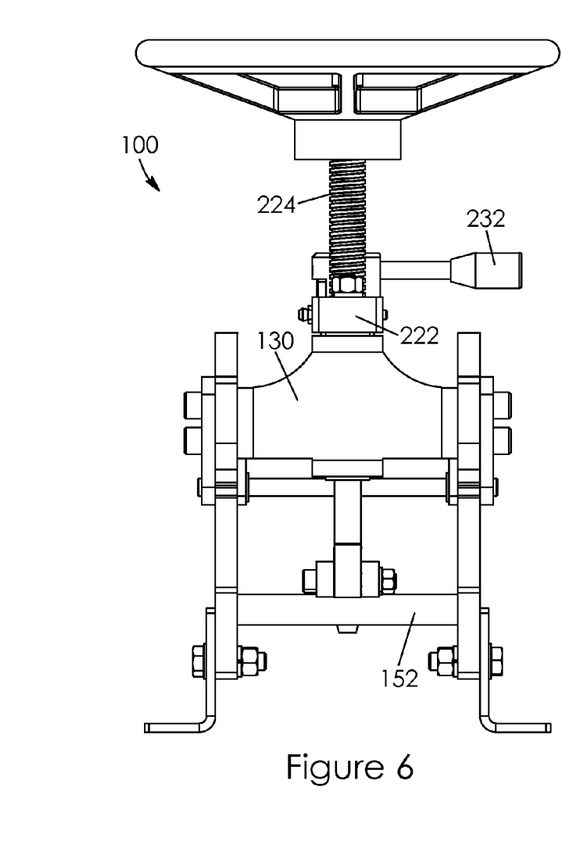
FIG. 6 is a second side elevation view of the pinch valve of FIG. 2.
Figure 8:
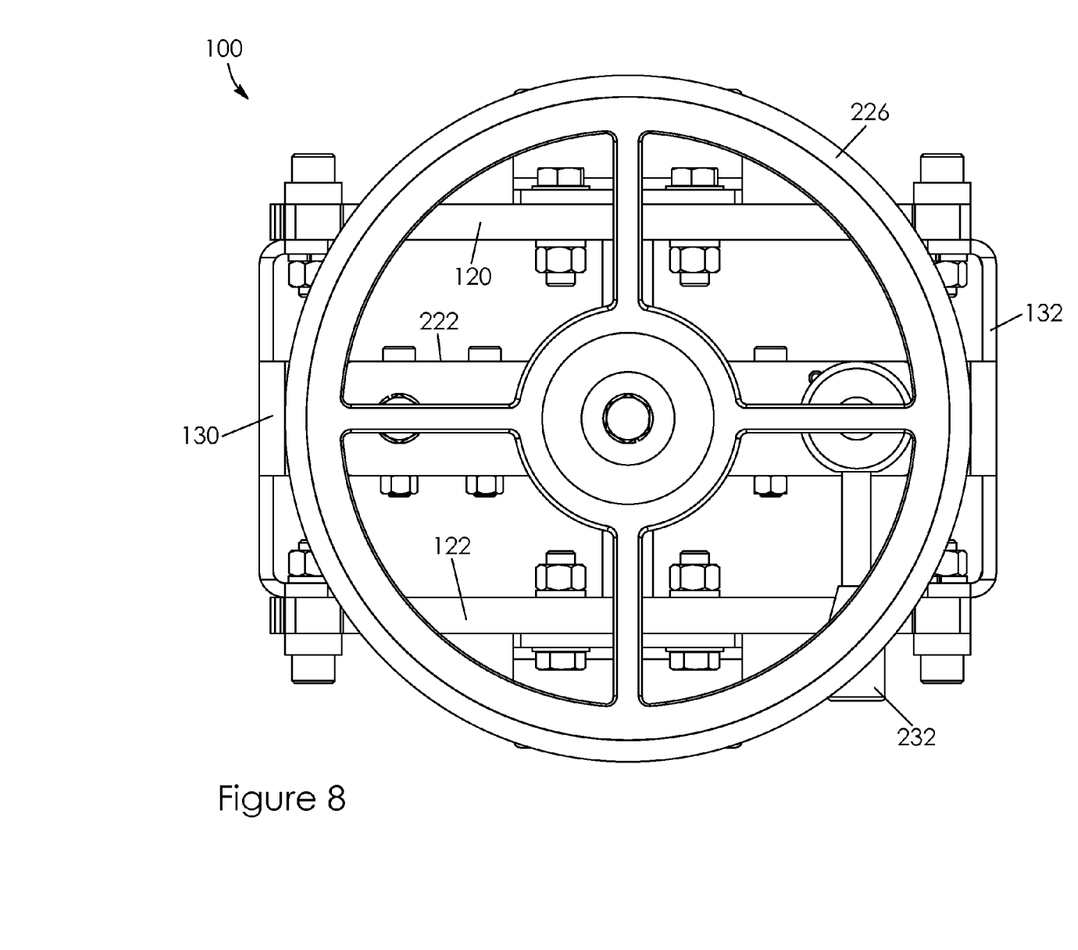
FIG. 8 is a top view of the pinch valve of FIG. 2.

FIG. 2 is a first perspective view of a pinch valve according to an embodiment. FIG. 3 is a second perspective view of the pinch valve of FIG. 2. FIG. 4 is a first front elevation view of the pinch valve of FIG. 2. FIG. 5 is a first side elevation view of the pinch valve of FIG. 2. FIG. 6 is a second side elevation view of the pinch valve of FIG. 2. FIG. 8 is a top view of the pinch valve of FIG. 2. Referring at once to FIGS. 2-6 and 8, a pinch valve 100 comprises an upper casing 110 and a lower casing 150. The upper casing 110 comprises two (2) opposed upper plates 120, 122 connected at their extremities by opposed braces 130, 132. The upper casing 110 is pivotably connected to the lower casing 150 by pivots 190, whereby the pinch valve 100 may be opened and closed by moving one or the other of the upper and lower casings 110 and 150 through rotation thereof on the pivots 190. The lower casing 150 also comprises two opposed lower plates 160, 162. As illustrated, the pivot 190 is made part of hinges 192. Other manners of implementing a pivot for pivotably connecting the upper casing 110 and the lower casing 150, including use of a common pivot linking bot lower plates 160, 162, will readily come to mind to those of ordinary skill in the art having the benefit of the present disclosure. The lower casing 150 may further comprise a reinforcement brace 151 extending between the lower plates 160, 162.

Each upper plate has a semi-circumferential void 124 (shown on a later Figure) and 126 while each lower plate has a semi-circumferential void 164 (also shown on a later Figure) and 166 matching the voids 124, 126 of the upper plates 120, 122. The voids are adapted for receiving a sleeve such as for example the sleeve 10 of FIG. 1. Rims 125, 127, 165 and 167 of the voids 124, 126, 164 and 166 are shaped to mate with the lips 16 and 18 of the sleeve 10. It may be observed that while conventional sleeves are usually bolted to conventional pinch valves, the sleeve 10 is not required to be bolted to the pinch valve 100. However, a variation of the present disclosed pinch valve allowing bolting of a sleeve to the pinch valve is within the scope of the present disclosure.

The upper and lower plates comprise, on their external faces, apertures 171-178 for installation of external conduits (not shown) on both sides of the pinch valve 100, providing a fluid connection between the sleeve 10 and the external conduits. These conduits are terminated with plates having their own apertures that match the apertures 171-178 and that may be fixedly connected to the pinch valve 100 using bolts, nuts, or similar attachments (not shown).

It will be understood that the sleeve 10 may be inserted in the pinch valve 100 when the pinch valve 100 is an open position. After closing of the pinch valve 100, when the sleeve 10 is installed in the pinch valve 100 and when the external conduits are bolted or otherwise attached to the upper and lower plates, the pinch valve 100 can no longer be opened. The lips 16, 18 of the sleeve 10 are firmly maintained on the rims 125, 127, 165 and 167. A tight seal may be obtained between the sleeve 10 and the external conduits, if required by the application, using techniques that are well known to those skilled in the art.

FIGS. 4, 6 and 8 represent a pinch valve 100 built for accommodating external conduits have an internal diameter of about 4.25 inches, this diameter being shared by the internal passage 14 of the sleeve 10. Dimensions shown on FIGS. 4, 6 and 8 are for illustration purposes and are not limiting the present disclosure. The disclosed pinch valve 100 may be adapted to various sizes, accommodating, without limitations, external conduits and sleeves from 2 to 48 inches in diameter. Conduits specified in US or metric dimensions may be accommodated by the disclosed pinch valve 100.

The upper casing 110 supports an upper pinch element 112 while the lower casing 150 supports a lower pinch element 152. A synchronization mechanism 220 is configured for moving the upper pinch element 112 and the lower pinch element 152 for pinching the sleeve 10 inserted therebetween.

The synchronization mechanism 220 comprises a rotating shaft 224 connected at its bottom 225 to the upper pinch element 112. The rotating shaft 224 is screwable into a movable top member 222. The synchronization mechanism 220 is supported by the upper casing 110 by slidably mounting the synchronization shafts 227, 228 to the braces 130, 132. The synchronization shafts 227, 228 are attached, at their top, to the movable top member 222 and, at their bottom, to the lower pinch element 152. A handwheel 226 may be connected to the rotating shaft 224 for actuation of the pinch valve 100.

Besides the handwheel 226, other mechanisms (not shown) may be used to drive rotation of the rotating shaft 224: the synchronization mechanism 220 may be driven by an actuator comprising any one of (i) a mechanical system, (ii) an electrical system, (iii) a pneumatic system, and (iv) a hydraulic system. Regardless, rotation of the rotating shaft 224 engages an up or down movement of the upper pinch element 112 and drives an opposite movement of the movable top member 222. As the movable top member 222 moves up or down, its connection to the lower pinch element 152 via the synchronization shafts 227 and 228 engages a corresponding movement of the lower pinch element 152. As a result, the upper pinch element 112 may move down as the lower pinch element 152 moves up, thereby constricting the sleeve 10.

As shown, a first synchronization shaft 227, proximate to the pivot 190, is pivotably connected to one end of the lower pinch element 152. A second synchronization shaft 228, at an opposed end of the synchronization mechanism 220 and distant from the pivot 190, is releasably connected to an opposed end of the lower pinch element 152. The second synchronization shaft 228 is rotatable and comprises a pin 230 for locking the second synchronization shaft 228 to the lower pinch element 152. A handle 232 is provided for rotating the second synchronization shaft 228 for disengaging the pin 230 of the second synchronization shaft 228 from the lower pinch element 152.

In operation, when opening the pinch valve 100 for dismounting a worn sleeve 10 or for mounting a new sleeve 10, an operator may first dismount any external conduits from the pinch valve 100, to free the upper casing 110 from the lower casing 150, and turn the handle 232 to release the end of the lower pinch element 152 from the pin 230. Because the other end of the lower pinch element 152 is pivotably connected to the first synchronization shaft 227, the lower pinch element 152 may move freely out of the way and allow free access to the sleeve 10. Of course, a variant in which the lower pinch element 152 is fully detachable from both synchronization shafts 227 and 228 is within the scope of the present disclosure.

The lower casing 150 may comprise or be attached to mounting plates 158 for attachment of the pinch valve 100 to a support (not shown), such as a floor, a frame, and the like. Hence, the lower casing 150 may be installed in a fixed position while the upper casing 110 may be movable. Of course, in other configurations, the upper casing 110 may be fixedly positioned while the lower casing 150 may be movable. In yet other positions, both the upper and lower casings may be movable.

In a variant, the rims 125, 127, 165 and 167 may be modified and differ from the semi-circumferential shapes shown on the various Figures. As an example, a notch or a groove (not shown) may be added on at least one of the rims. A matching pattern may be implemented on a lip of a sleeve specially built for use with a modified pinch valve 100. In such a case, installation of the sleeve on the modified pinch valve 100 requires proper alignment of the pattern with the notch or groove of the rims. The sleeve may then be specially designed for being compressed in the proper alignment.

Figure 7:
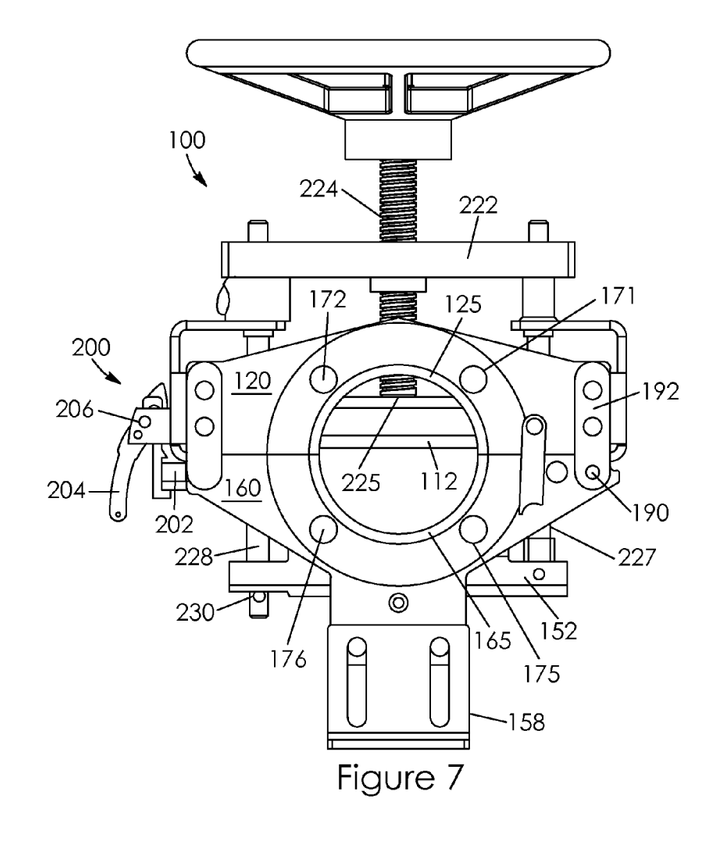
FIG. 7 is a front elevation view of an alternative embodiment of a pinch valve.

FIG. 7 is a front elevation view of an alternative embodiment of a pinch valve. This alternative embodiment comprises most of the above described elements of the pinch valve 100. In addition, a locking element 200 is adapted to maintain the upper casing 110 and the lower casing 150 in the locked position, as shown on all of FIGS. 2-6. The locking element 200 may comprise a tab 202 mounted to one of the upper and lower casings, for example on the lower casing 150 as illustrated, and a handle 204, adapted to lock on the tab 202, the handle 204 being mounted to another one of the upper and lower casings, for example on the upper casing 110 as illustrated. The handle 204 may connect to one of the upper and lower casings using angle plates 206 bolted, welded or otherwise fixedly attached to the one of the upper and lower casings. The upper and lower casings may then be brought together and locked in closed position using the locking element 200. As shown on FIG. 7, the upper pinch element 112 is lowered while the lower pinch element 152 is also lowered. Hence, the upper and lower pinch elements as shown are not synchronized. This particular view is provided for ease of illustration and does not actually represent a normal operating mode of the pinch valve 110. The locking element 200 is optional and may not be present in some embodiments. The locking element 200 may facilitate installation operations, in some configurations, for example when the pinch valve 100 is installed upside down, attached at the top using the mounting plates 158. In such cases, the operator may bring together the upper casing 110 and the lower casing 150—which are now in reversed positions—and lock them in closed configuration before attachment of the external conduits.

Figure 9:
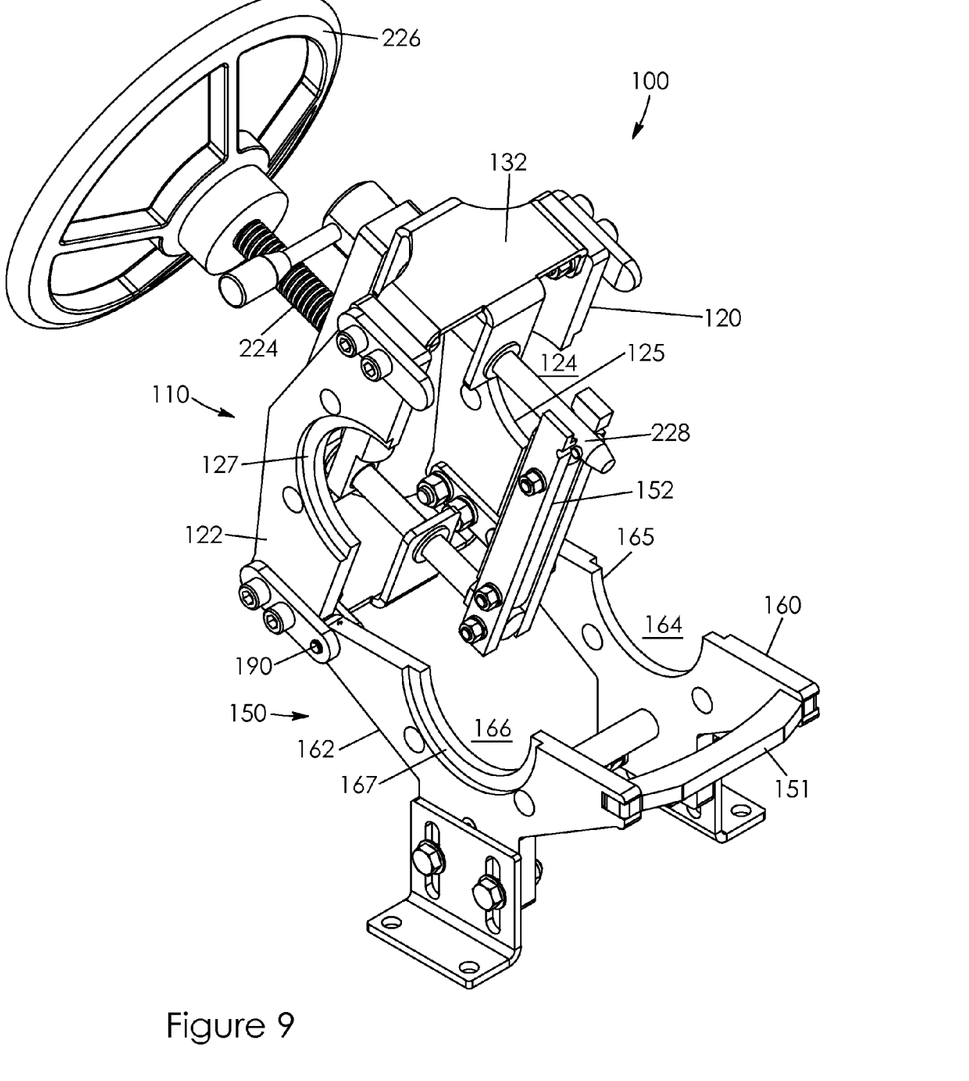
FIG. 9 is a third perspective view of the pinch valve of FIG. 2, shown with the upper casing raised apart from the lower casing.
Figure 10:
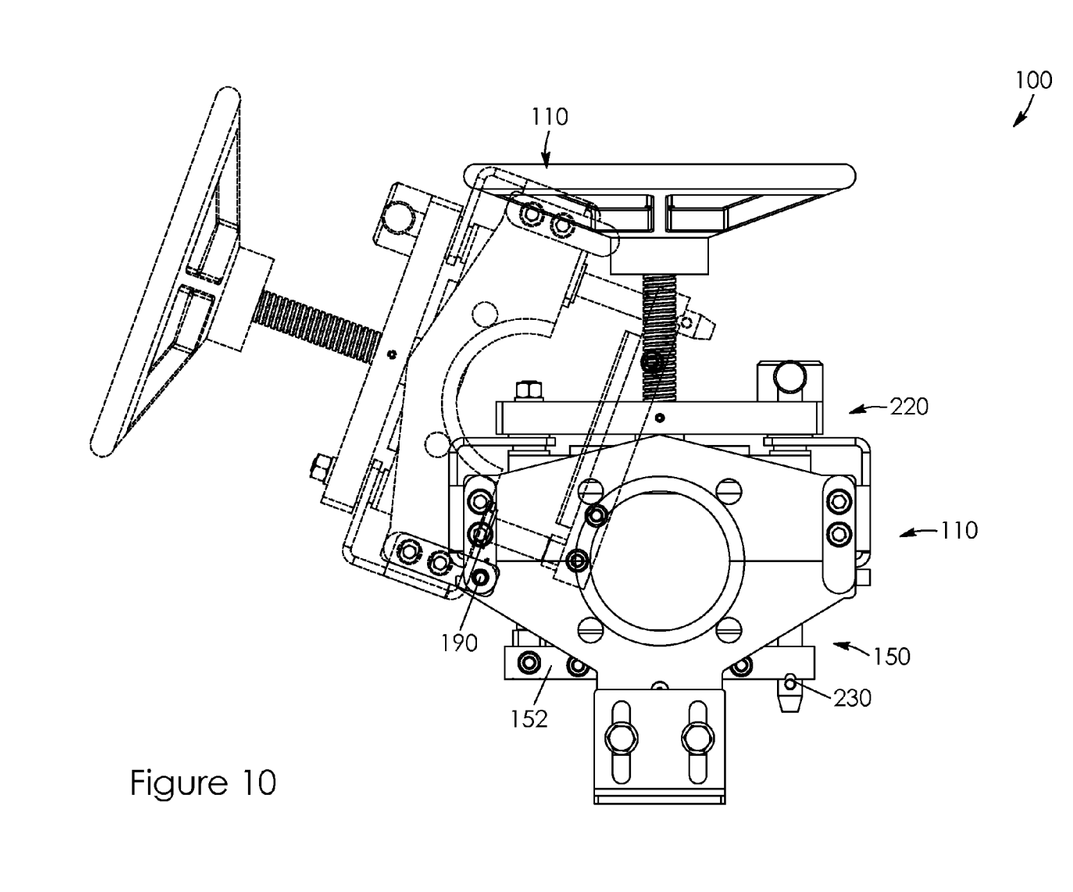
FIG. 10 is the first front elevation view of the pinch valve of FIG. 2, similar to the view of FIG. 4, with a ghost image of the upper casing in raised position.

FIG. 9 is a third perspective view of the pinch valve of FIG. 2, shown with the upper casing raised apart from the lower casing. FIG. 10 is the first front elevation view of the pinch valve of FIG. 2, similar to the view of FIG. 4, with a ghost image of the upper casing in raised position. FIGS. 9 and 10 show that the sleeve 10 may be changed on site while the pinch valve 100 is still mounted in its environment. It should be observed that, as shown on FIGS. 9 and 10, the lower pinch element 152 is still attached to the synchronization shaft 228 using the pin 230 though the pinch valve 100 is in open position. Of course, the operator will need to dismount the lower pinch element 152 from the synchronization shaft 228 before installation of the sleeve 10 within the voids 124, 126, 164 and 166. The pinch element 152 can easily be reattached to the synchronization shaft 228 after closing of the pinch valve 100. FIG. 10 shows a variant in which the upper casing 110 and the lower casing 150 are separable by a 70 degree rotation on the pivots 190. This amount of rotation is non-limiting and is provided for illustration purposes.

Figure 11:
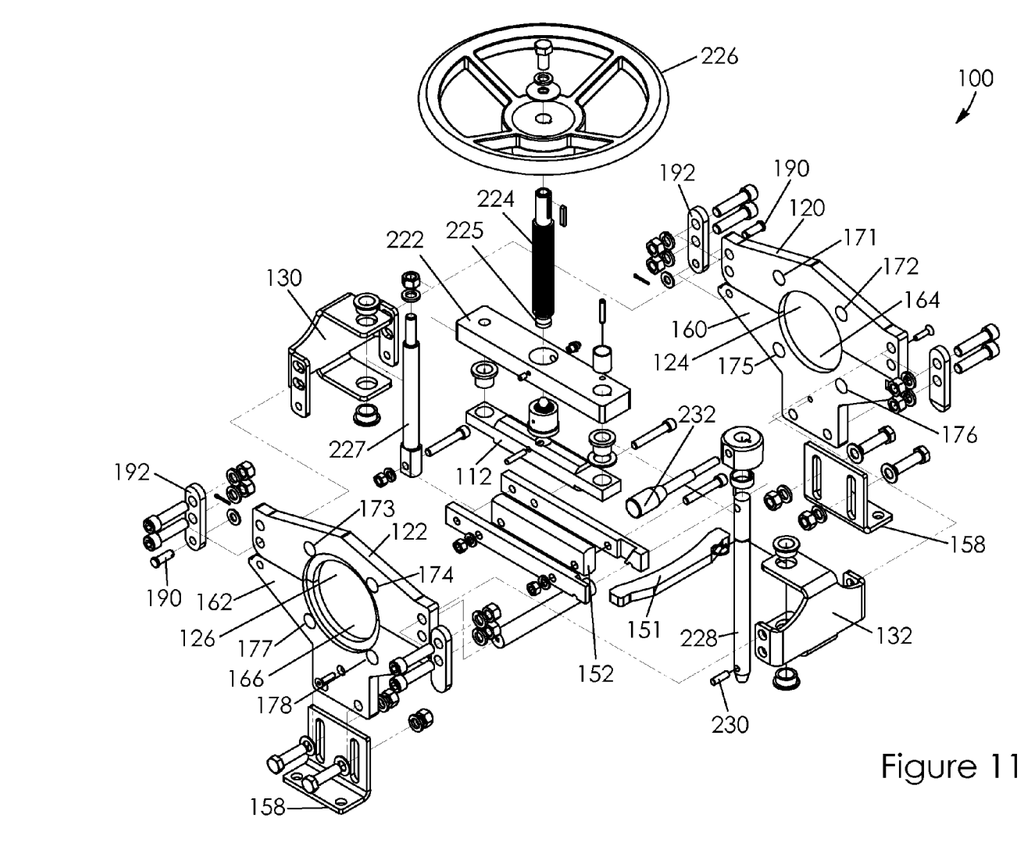
FIG. 11 is an exploded, perspective view of components of the pinch valve of FIG. 2, according to a particular variant.

FIG. 11 is an exploded, perspective view of components of the pinch valve of FIG. 2, according to a particular variant. The illustrated variant shows plural optional elements for attachment of the various components described hereinabove. Of course, those of ordinary skill in the art are familiar with these types of attachments and will be able to select attachment means of their choice.

Components of the illustrated pinch valve 100 may be constructed from various solid materials, including without limitation steel, brass, aluminum, other metals, strong plastics, and the like. Some of the components may be joined using bolts and nuts. Some components may be joined by welding or gluing. Some components may be combined as they are constructed, for example by molding, forging or casting two elements as a unitary piece. Those of ordinary skill in the art having the benefit of the present disclosure will be able to select materials and methods of assembly of the pinch valve 100 according to specific applications.

Though the present disclosure illustrates a pinch valve having the shown upper and lower casings forming an open frame construction, the present teachings are equally applicable to any pinch valve having a closed frame construction.

Those of ordinary skill in the art will realize that the description of the pinch valve are illustrative only and are not intended to be in any way limiting. Other embodiments will readily suggest themselves to such persons with ordinary skill in the art having the benefit of the present disclosure. Furthermore, the disclosed pinch valve may be customized to offer valuable solutions to existing needs and problems of pinch valve maintenance.

In the interest of clarity, not all of the routine features of the implementations of pinch valve are shown and described. It will, of course, be appreciated that in the development of any such actual implementation of the pinch valve, numerous implementation-specific decisions may need to be made in order to achieve the developer's specific goals, such as compliance with application-, system-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of industrial valves having the benefit of the present disclosure.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A pinch valve in combination with a replaceable sleeve, the pinch valve comprising:
   an upper casing and a lower casing each comprising a sleeve rim engageable with a section of a lip of the replaceable sleeve, the upper casing and the lower casing being pivotably connected and being pivotable between a closed position where the sleeve rim of the upper casing and the lower casing is engaged to the lip of the replaceable sleeve and an open position where the sleeve rim of at least one of the upper casing and the lower casing is disengaged from the lip of the replaceable sleeve; and
   a synchronization mechanism comprising:
      a synchronisation shaft;
      an upper pinch element operatively engaged with the synchronisation shaft;
      a lower pinch element selectively operatively engageable with and disengageable from the synchronisation shaft, each one of the upper pinch element and the lower pinch element extending on a respective side of the replaceable sleeve when operatively engaged to the synchronisation shaft, and being movable with respect to one another, the lower pinch element being disengaged from the synchronisation shaft when the upper casing and the lower casing are in the open position.

2. The pinch valve of claim 1, further comprising a locking element having a tab mounted to one of the upper casing and the lower casing and a handle mounted to the other one of the upper casing and the lower casing, the handle being configured to lock on the tab.

3. The pinch valve of claim 1, wherein the synchronization mechanism further comprises a movable top member and a rotating shaft screwable through the movable top member and connected at one end to the upper pinch element, the movable top member, the rotating shaft and the synchronization shaft cooperating to move the upper pinch element and the lower pinch element respectively to one another.

4. The pinch valve of claim 3, wherein rotation of the rotating shaft causes movement of the upper pinch element and the movable top member in opposite directions, the synchronization shaft operatively connecting the movable top member, the upper pinch element and the lower pinch element to move the upper pinch element and the lower pinch element in opposite directions upon movement of the movable top member.

5. The pinch valve of claim 1, further comprising a handle operatively connected to the synchronization shaft and operable to rotate the synchronization shaft to selectively disconnect the synchronization shaft from the lower pinch element.

6. The pinch valve of claim 1, wherein the synchronization mechanism further comprises a second synchronization shaft with an end connected to the movable top member and an opposed end pivotably connected to the lower pinch element.

7. The pinch valve of claim 1, wherein the lower casing is attached to a support, the upper casing being pivotable about the lower casing.

8. The pinch valve of claim 1, wherein:
the upper casing comprises two opposed upper plates connected by braces at opposed ends and having a substantially semi-circumferential upper void section defined therein, with a section of the replaceable sleeve extending in the substantially semi-circumferential upper void section; and
the lower casing comprises two opposed lower plates connected by braces at opposed ends and having a substantially semi-circumferential lower void section matching the substantially semi-circumferential upper void section of a corresponding one of the upper plates, with a section of the replaceable sleeve extending in the substantially semi-circumferential lower void section.

9. The pinch valve of claim 8, wherein each one of the upper void section and the lower void section is defined by a corresponding one of the sleeve rim, the sleeve rim of at least one of the upper plates and the lower plates comprising one of a notch and a groove, the removable sleeve comprising a lip having a pattern adapted to match a corresponding pattern of the one of the notch and groove.

10. The pinch valve of claim 1, wherein the upper casing and the lower casing comprise external faces with apertures adapted to connect external conduits thereto, the external conduits being in fluid connection with the replaceable sleeve when connected to the external faces of the upper casing and the lower casing.

11. A replaceable sleeve pinch valve comprising:
an upper casing and a lower casing defining therebetween a sleeve receiving channel in which a removable sleeve is insertable, the upper casing and the lower casing beign pivotally connected to one another and being pivotable between a closed position and an open position, the open position allowing insertion and removal of the removable sleeve from the sleeve receiving channel and the closed position preventing removal of the removable sleeve from the sleeve receiving channel; and
a synchronization mechanism comprising:
an upper pinch element and a lower pinch element movable respectively to one another to pinch the sleeve, the upper pinch element and the lower pinch element being located respectively on an upper side of the sleeve receiving channel and a lower side of the sleeve receiving channel when the upper casing and the lower casing are in the closed position; and
a synchronization shaft releasably connectable to the lower pinch element.

12. The pinch valve of claim 11, further comprising a locking element having a tab mounted to one of the upper casing and the lower casing and a handle mounted to the other one of the upper casing and the lower casing and being configured to lock on the tab.

13. The pinch valve of claim 11, wherein the synchronization mechanism further comprises:
a movable top member; and
a rotating shaft screwable through the movable top member and connected at one end to the upper pinch element;
and wherein the synchronization shaft is connected at one end to the movable top member and releasably connected at an opposed end to the lower pinch element, the movable top member, the rotating shaft and the synchronization shaft cooperating to move the upper pinch element and the lower pinch element respectively to one another.

14. The pinch valve of claim 13 further comprising a handle operatively connected to the synchronization shaft and operable to rotate the synchronization shaft to selectively disconnect the synchronization shaft from the lower pinch element.

15. The pinch valve of claim 13, wherein the synchronization mechanism further comprises a second synchronization shaft with an end connected to the movable top member and an opposed end pivotably connected to the lower pinch element.

16. The pinch valve of claim 11, wherein:
the upper casing comprises two opposed upper plates connected by braces at opposed ends and having a substantially semi-circumferential upper void section defined therein, with a section of the removable sleeve extending in the substantially semi-circumferential upper void section; and
the lower casing comprises two opposed lower plates connected by braces at opposed ends and having a substantially semi-circumferential lower void section matching the substantially semi-circumferential upper void section of a corresponding one of the upper plates, with a section of the removable sleeve extending in the substantially semi-circumferential lower void section.

17. The pinch valve of claim 16, wherein each one of the semi-circumferential void section of the upper plates and the lower plates is defined by a rim, the rim of at least one of the upper plates and the lower plates comprising one of a notch and a groove adapted to match a corresponding pattern of a lip of the removable sleeve.

18. A method for replacement of the replaceable sleeve pinch valve, the method comprising the steps of:
providing an upper casing and a lower casing defining therebetween a sleeve receiving channel in which a removable sleeve is insertable, the upper casing and the lower casing being pivotally connected to one another and being pivotable between a closed and an open position, the open position allowing insertion and removal of the removable sleeve from the sleeve receiving channel and the closed position preventing removal of the removable sleeve from the sleeve receiving channel;

providing a synchronization mechanism comprising:
- an upper pinch element and a lower pinch element movable respectively to one another to pinch the sleeve, the upper pinch element and the lower pinch element being located respectively on an upper side of the sleeve receiving channel and a lower side of the sleeve receiving channel when the upper casing and the lower casing are in the closed position; and
- a synchronization shaft releasably connectable to the lower pinch element;

disconnecting the synchronization shaft from the lower pinch element;

pivoting at least one of the upper casing and the lower casing in the open position;

pivoting the at least one of the upper casing and the lower casing in the closed position; and reconnecting the synchronization shaft to the lower pinch element.

19. The method of claim 18, further comprising the steps of:

unlocking the upper casing from the lower casing prior to the step of pivoting the at least one of the upper casing and the lower casing in the open position; and locking the upper casing to the lower casing subsequently to the step of pivoting the at least one of the upper casing and the lower casing in the closed position.

20. The method of claim 18, further comprising the steps of:

disconnecting external conduits from the upper casing and the lower casing prior to the step of pivoting the at least one of the upper casing and the lower casing in the open position; and reconnecting the external conduits to the upper casing and the lower casing subsequently to the step of pivoting the at least one of the upper casing and the lower casing in the closed position.

* * * * *